US012230287B2

(12) United States Patent
Harada et al.

(10) Patent No.: US 12,230,287 B2
(45) Date of Patent: Feb. 18, 2025

(54) QUANTIZATION SCALE FACTOR DETERMINATION DEVICE AND QUANTIZATION SCALE FACTOR DETERMINATION METHOD

(71) Applicant: Panasonic Intellectual Property Corporation of America, Torrance, CA (US)

(72) Inventors: Akira Harada, Kanagawa (JP); Hiroyuki Ehara, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 546 days.

(21) Appl. No.: 17/768,801

(22) PCT Filed: Sep. 4, 2020

(86) PCT No.: PCT/JP2020/033579
§ 371 (c)(1),
(2) Date: Apr. 13, 2022

(87) PCT Pub. No.: WO2021/075167
PCT Pub. Date: Apr. 22, 2021

(65) Prior Publication Data

US 2023/0025447 A1 Jan. 26, 2023

(30) Foreign Application Priority Data

Oct. 16, 2019 (JP) ................................ 2019-189177

(51) Int. Cl.
*G10L 19/035* (2013.01)

(52) U.S. Cl.
CPC ................................ *G10L 19/035* (2013.01)

(58) Field of Classification Search
CPC .................................................... G10L 19/035
See application file for complete search history.

(56) References Cited

U.S. PATENT DOCUMENTS

2019/0156843 A1 5/2019 Multris et al.

FOREIGN PATENT DOCUMENTS

| | | | | | |
|---|---|---|---|---|---|
| CA | 2966987 | A1 | * | 1/2013 | |
| CA | 2951593 | C | * | 2/2019 | |
| JP | 2009198612 | A | * | 9/2009 | G10L 19/035 |
| JP | 2016533515 | A | * | 10/2016 | G10L 19/02 |
| JP | 2019514065 | A | * | 5/2019 | G10L 19/0204 |

OTHER PUBLICATIONS

International Search Report (including English Language Translation), mailed Oct. 6, 2020, by the Japan Patent Office, for International Application No. PCT/JP2020/033579.

* cited by examiner

*Primary Examiner* — Anne L Thomas-Homescu
(74) *Attorney, Agent, or Firm* — Greenblum & Bernstein, P.L.C.

(57) ABSTRACT

This quantization scale factor determination device is provided with a correction circuit which corrects an initial value of a quantization scale factor on the basis of whether or not an audio signal spectrum is sparse, and a search circuit which searches for a quantization scale factor on the basis of the initial value.

10 Claims, 11 Drawing Sheets

QUANTIZATION SCALE FACTOR DETERMINATION DEVICE AND QUANTIZATION SCALE FACTOR DETERMINATION METHOD

TECHNICAL FIELD

The present disclosure relates to a quantization scale factor determination apparatus and a quantization scale factor determination method.

BACKGROUND ART

A Modified Discrete Cosine Transform (MDCT) spectral arithmetic coding technique is one coding technique for encoding a speech signal or an audio signal (e.g., also referred to as a "speech audio signal") at a low bit rate. This coding technique, for example, scales (or referred to as quantization scaling), quantizes, and performs arithmetic coding on MDCT spectra (e.g., see Patent Literature (hereinafter, referred to as "PTL" 1).

CITATION LIST

Patent Literature

PTL 1

Japanese Unexamined Patent Application Publication (Translation of PCT Application) No. 2019-514065

SUMMARY OF INVENTION

However, there is scope for further study on a method for reducing the amount of mathematical operation in coding of speech signals or audio signals.

One non-limiting exemplary embodiment of the present disclosure facilitates providing a quantization scale factor determination apparatus and a quantization scale factor determination method capable of reducing the amount of mathematical operation in coding of speech signals or audio signals.

A quantization scale factor determination apparatus according to an embodiment of the present disclosure includes: correction circuitry, which, in operation, corrects an initial value of a quantization scale factor based on whether or not a spectrum of a speech audio signal has sparsity: and search circuitry, which, in operation, searches for the quantization scale factor based on the initial value.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to one exemplary embodiment of the present disclosure, it is possible to reduce the amount of mathematical operation in coding of speech signals or audio signals.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the accompanying drawings.

In PTL 1, for example, an inverse of a Root Mean Square (RMS) of values obtained by multiplication between an envelope of MDCT spectra obtained based on a linear predictive analysis (e.g., linear prediction coding (LPC) analysis) and the absolute values of the MDCT spectra is configured as an initial value of a "quantization scale factor" in quantization scaling of the MDCT spectra.

An encoding apparatus performs a search process for a quantization scale factor, for example, based on the initial value of the quantization scale factor. For example, the encoding apparatus estimates, based on the quantization scale factor, the amount of bits consumed by arithmetic coding on the MDCT spectra (e.g., referred to as the "consumption bit amount") from an approximate expression. Then, the encoding apparatus compares the estimated consumption bit amount with a target bit amount, and searches for, for example, a quantization scale factor satisfying conditions of "not exceeding the target bit amount" and "closest to the target bit amount" in accordance with a binary search method.

However, for example, the farther away the initial value of the quantization scale factor is from the quantization scale factor after the search (in other words, a convergence value in the binary search), the more the number of searches performed until value convergence in the search. Accordingly, there is a possibility that the amount of mathematical operation in the encoding apparatus increases. Further, it is known that the binary search method is a slow convergence method.

Therefore, one exemplary embodiment of the present disclosure will be described in relation to a method for reducing the amount of mathematical operation in the search for a quantization scale factor.

Overview of Transmission System

Figure 1:
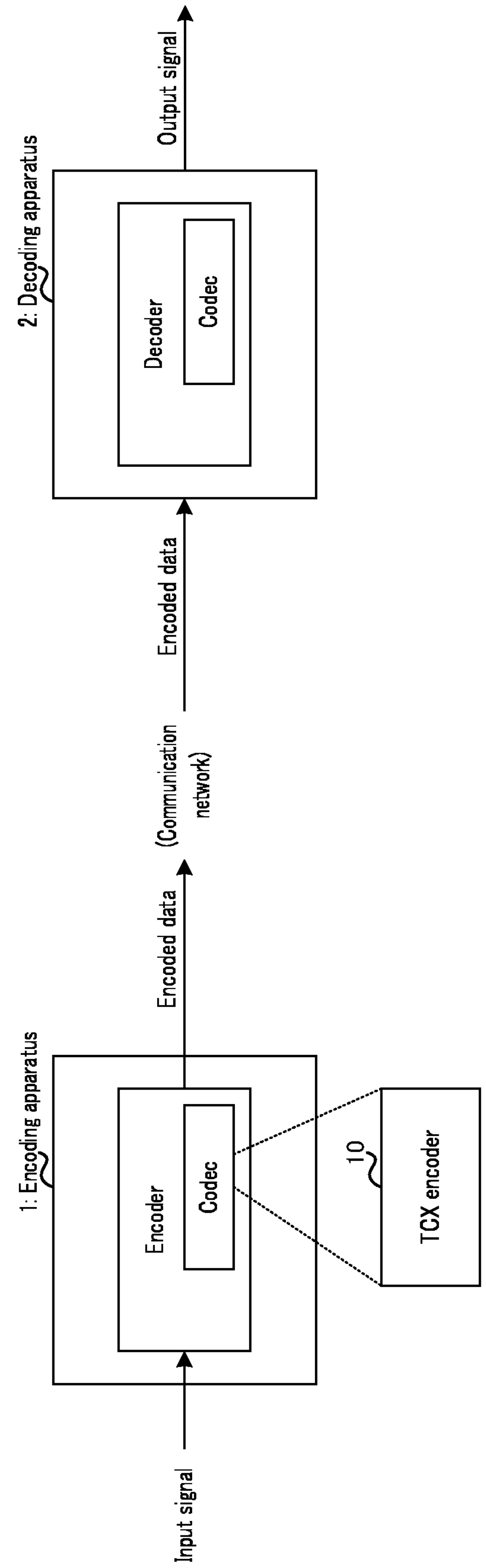
FIG. 1 is a block diagram illustrating an exemplary configuration of a transmission system for transmission of a speech signal or an audio signal.

FIG. 1 illustrates an exemplary configuration of a transmission system for transmission of a speech signal or an audio signal according to the present embodiment.

The transmission system illustrated in FIG. 1 includes, for example, encoding apparatus 1 and decoding apparatus 2.

Encoding apparatus 1 encodes an input signal, such as, for example, a speech signal or an audio signal, and transmits encoded data to decoding apparatus 2 via a communication network or a storage medium (not illustrated). For example, encoding apparatus 1 may include various speech audio codecs (e.g., encoders) defined in standards such as Moving Picture Experts Group (MPEG), 3rd Generation Partnership Project (3GPP) or International Telecommunication Union Telecommunication Standardization Sector (ITU-T).

Decoding apparatus 2 decodes the encoded data received from encoding apparatus 1 via, for example, a transmission path or a storage medium, and outputs an output signal (for example, an electric signal). Decoding apparatus 2 may, for example, output the electrical signal as an acoustic wave via a speaker or headphones. Further, decoding apparatus 2 may use, for example, a decoder corresponding to the above-described speech audio codecs.

In addition, the codecs in encoding apparatus 1 may include, for example, transformed code excitation (TCX) encoding, which is one frequency-domain encoding. For example, encoding apparatus 1 illustrated in FIG. 1 includes TCX encoder 10 that performs TCX encoding processing.

The TCX encoding may be applied, for example, to encoding in low bit rate transmissions such as transmissions at 13.2 kbps or 16.4 kbps. Note that, the bit rate of transmission to which the TCX encoding is applied is not limited to 13.2 kbps and 16.4 kbps, and may be other bit rates. The TCX encoding that uses MDCT to encode excitation signals may also be referred to, for example, as "MDCT based TCX."

Configuration Example of TCX Encoder 10

Figure 2:
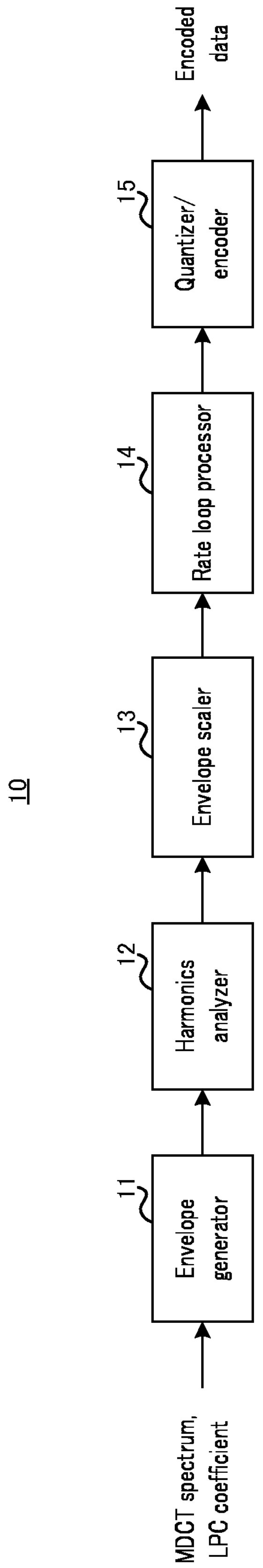
FIG. 2 is a block diagram illustrating an exemplary configuration of a TCX encoder.

FIG. 2 illustrates an exemplary configuration of TCX encoder 10 included in encoding apparatus 1 illustrated in FIG. 1. TCX encoder 10 illustrated in FIG. 2 includes, for example, envelope generator 11, harmonics analyzer 12, envelope scaler 13, rate loop processor 14, and quantizer/encoder 15.

For example, a frequency-domain signal obtained by MDCT performed on an input signal (hereinafter referred to as "MDCT spectrum") and LPC coefficients obtained by LPC analysis performed on the input signal are inputted to envelope generator 11. Envelope generator 11 generates an envelope of MDCT spectra based on, for example, the LPC coefficients. Envelope generator 11 outputs envelope information indicating the generated envelope and spectral information indicating the MDCT spectra to harmonics analyzer 12.

Harmonics analyzer 12 analyzes a harmonics structure (in other words, harmonic components) in the MDCT spectra, for example, based on the information inputted from envelope generator 11. Harmonics analyzer 12 outputs, for example, harmonics information, envelope information, and spectral information indicating the analysis result of the harmonics structure to envelope scaler 13.

For example, the harmonics information may include information indicating whether or not the MDCT spectra have the harmonics structure (e.g., referred to as a "harmonics flag" or a "harmonics model flag"). The harmonics information may include, for example, an index (e.g., referred to as a "harmonics gain index") indicating a harmonics gain. The harmonics gain index may be, for example, a value obtained by indexing (in other words, quantizing) the harmonics gain for each certain level. For example, the higher the value of the harmonics gain index, the higher the harmonics gain level may be.

Envelope scaler 13 performs a scaling process on the envelope of MDCT spectra based on, for example, the information inputted from harmonics analyzer 12. Envelope scaler 13 outputs the envelope information, harmonics information, and spectral information indicating the scaled envelope to rate loop processor 14.

Rate loop processor 14 performs, based on the information inputted from envelope scaler 13, rate loop processing (or, also referred to as quantization rate loop processing) to calculate a quantization scale factor for quantization of MDCT spectra. Rate loop processor 14 searches for the quantization scale factor, for example, based on comparison between a consumption bit amount and a target bit amount. A search method may be, for example, a binary search method or another search method.

Further, rate loop processor 14 may configure an initial value of the quantization scale factor for the search, for example, based on the sparsity in the MDCT spectra. Note that, an example of a configuration method for configuring the initial value of the quantization scale factor in rate loop processor 14 will be described later.

Rate loop processor 14 outputs information indicating the searched quantization scale factor and spectral information to quantizer/encoder 15.

Quantizer/encoder 15 quantizes and encodes the MDCT spectra based on the information inputted from rate loop processor 14 and outputs the resulting encoded data.

Configuration Example of Rate Loop Processor 14 and Quantizer/Encoder 15

Figure 3:
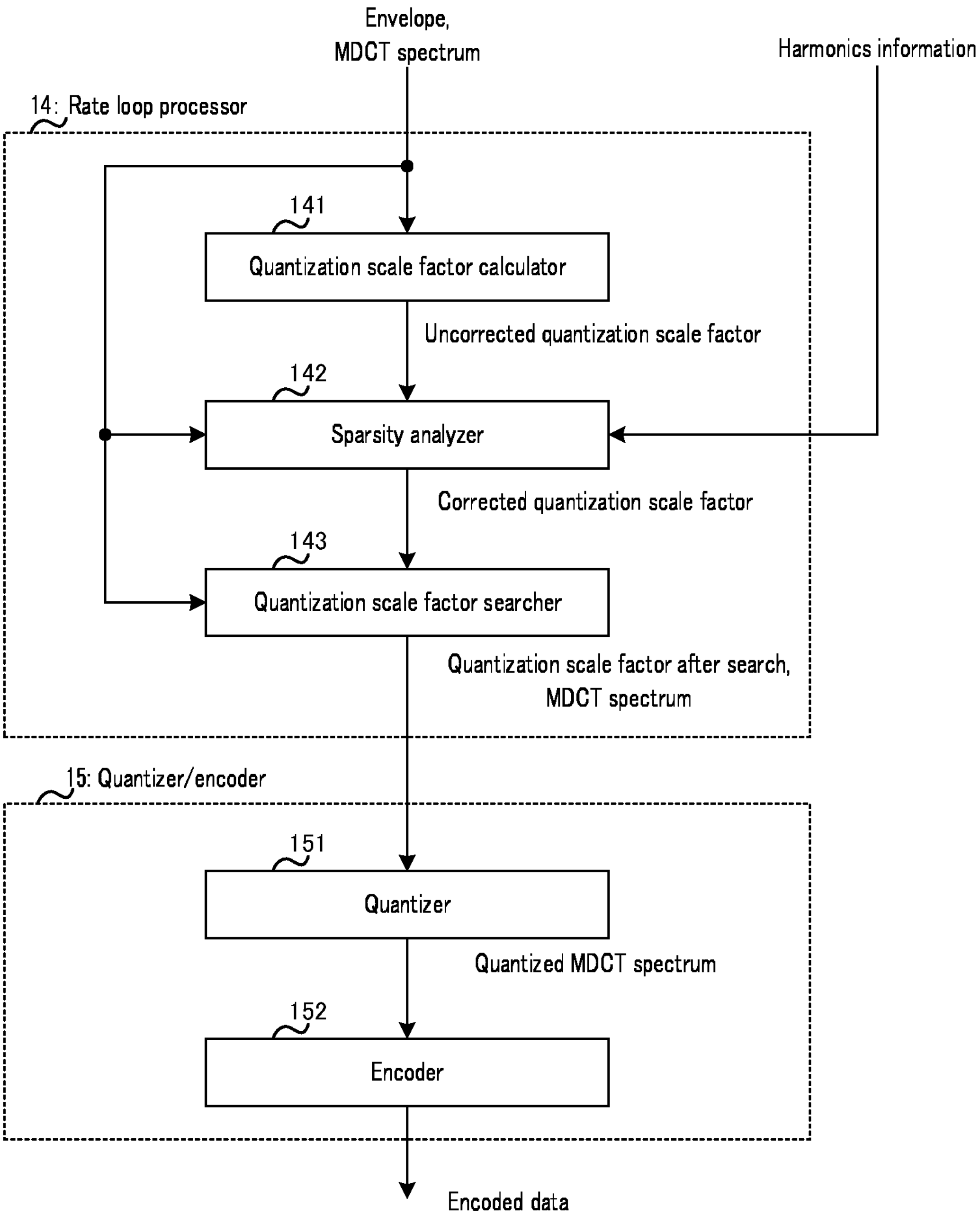
FIG. 3 is a block diagram illustrating an exemplary configuration of a rate loop processor and a quantizer/encoder.

FIG. 3 illustrates an exemplary configuration of rate loop processor 14 (e.g., corresponding to the quantization scale factor determination apparatus) and quantizer/encoder 15 included in TCX encoder 10 illustrated in FIG. 2.

Rate loop processor 14 illustrated in FIG. 3 includes, for example, quantization scale factor calculator 141 (e.g., corresponding to the calculation circuitry), sparsity analyzer 142, and quantization scale factor searcher 143 (e.g., corresponding to the search circuitry). Further, quantizer/encoder 15 illustrated in FIG. 3 includes, for example, quantizer 151 and encoder 152.

In rate loop processor 14 illustrated in FIG. 3, quantization scale factor calculator 141 calculates the initial value of the quantization scale factor in the quantization process for MDCT spectra based on, for example, the envelope information and the spectral information inputted from envelope scaler 13. For example, quantization scale factor calculator 141 may configure, as the initial value of the quantization scale factor (which may also be referred to as the "uncorrected quantization scale factor"), the inverse of the standard deviation of multiplication values (in other words, the amplitude spectra normalized by a spectral envelope) obtained by multiplication between the envelope (for example, the envelope obtained based on the LPC analysis) and the absolute values of the MDCT spectra. When the inverse of the standard deviation is used, the more dispersed the spectral amplitude values are, the smaller the quantization scale factor is, and the less dispersed the spectral amplitude values are, the larger the quantization scale factor is. Quantization scale factor calculator 141 outputs information indicating the uncorrected quantization scale factor to sparsity analyzer 142.

Note that the calculation method for calculating the quantization scale factor in quantization scale factor calculator 141 is not limited to the method described above. For example, quantization scale factor calculator 141 may configure, as the initial value of the quantization scale factor, the inverse of the variance of the multiplication values obtained by multiplication between the envelope and the absolute values of the MDCT spectra. Further, for example, quantization scale factor calculator 141 may configure, as the initial value of the quantization scale factor, the inverse of the root mean square of the multiplication values obtained by multiplication between the envelope and the MDCT spectra (this inverse may also be multiplied by a predetermined factor).

Sparsity analyzer 142 analyzes (in other words, judges) the sparsity of MDCT spectra based on, for example, at least one of the harmonics information, spectral information, and envelope information.

The term "sparsity" means a characteristic that, for example, in distribution of MDCT spectra, a small number of spectra (components) are non-zero and a large number of spectra (components) are zero (or components with amplitudes below thresholds). Alternatively, the sparsity is a state in which, for example, a small number of spectra account for a larger percentage of the spectral amplitudes (e.g., an amplitude sum of 50% or more) of the sum of the spectral amplitudes.

For example, sparsity analyzer 142 may determine, based on the analysis result on the sparsity, whether or not to correct the quantization scale factor inputted from quantization scale factor calculator 141. When the correction of the quantization scale factor is determined, sparsity analyzer 142 corrects the quantization scale factor and outputs information indicating the corrected quantization scale factor to quantization scale factor searcher 143. On the other hand, when the quantization scale factor is not to be corrected, sparsity analyzer 142 outputs, to quantization scale factor searcher 143, information indicating the quantization scale factor inputted from quantization scale factor calculator 141.

Quantization scale factor searcher 143 searches for the quantization scale factor based on the initial value of the quantization scale factor inputted from sparsity analyzer 142. Then, for example, quantization scale factor searcher 143 performs the binary search based on the comparison result between the consumption bit amount estimated for the arithmetic coding and the target bit amount, and outputs information indicating the quantization scale factor after the search to quantizer/encoder 15 (quantizer 151).

In quantizer/encoder 15 illustrated in FIG. 3, quantizer 151 quantizes the MDCT spectra based on the quantization scale factor inputted from quantization scale factor searcher 143. Quantizer 151 outputs information indicating the MDCT spectra after quantization to encoder 152.

Encoder 152 encodes the quantized MDCT spectra inputted from quantizer 151 and outputs the encoded data. The encoding method in encoder 152 may be, for example, arithmetic encoding or other encoding.

Configuration Example of Sparsity Analyzer 142

Figure 4:
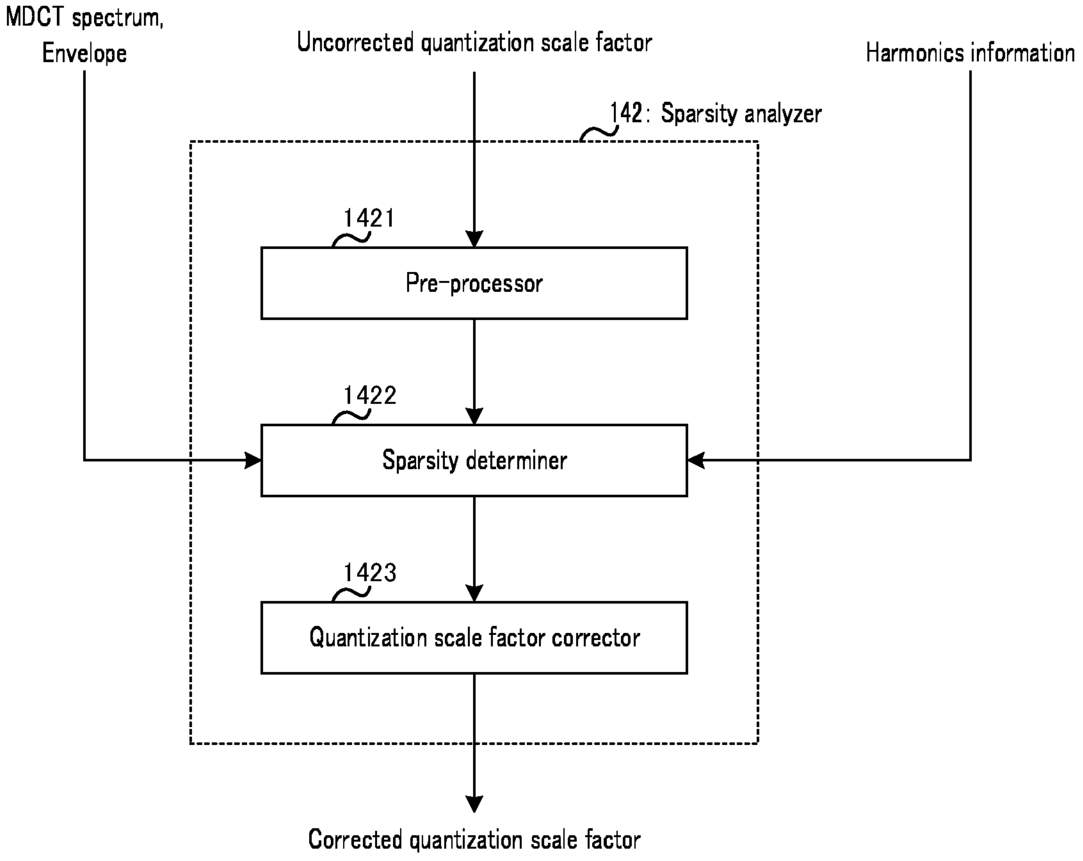
FIG. 4 is a block diagram illustrating an exemplary configuration of a sparsity analyzer.

FIG. 4 illustrates an exemplary configuration of sparsity analyzer 142.

Sparsity analyzer 142 illustrated in FIG. 4 includes, for example, pre-processor 1421 (corresponding to, for example, pre-processing circuitry), sparsity determiner 1422 (corresponding to, for example, judgement circuitry), and quantization scale factor corrector 1423 (corresponding to, for example, correction circuitry).

Pre-processor 1421, for example, performs pre-processing on the quantization scale factor (for example, the uncorrected quantization scale factor (initial value)) inputted from quantization scale factor calculator 141. Pre-processor 1421, for example, may adjust the upper limit value of the quantization scale factor. Further, pre-processor 1421 may multiply the quantization scale factor by a specific value (e.g., a value less than 1.00, for example). Pre-processor 1421 outputs information indicating the quantization scale factor after the pre-processing to sparsity determiner 1422.

Sparsity determiner 1422 determines whether or not the MDCT spectra have the sparsity. For example, sparsity determiner 1422 may judge the sparsity of the MDCT spectra based on the envelope information, harmonics information, and information on the MDCT spectra (e.g., absolute values of the MDCT spectra).

FIGS. 5A to 5D illustrate examples of MDCT spectra in a case where the MDCT spectra have the sparsity. In FIGS. 5A to 5D, the horizontal axis represents the frequency (e.g., frequency bin), and the vertical axis represents the amplitude of an MDCT spectrum (e.g., the absolute value of the amplitude).

Figure 5A:
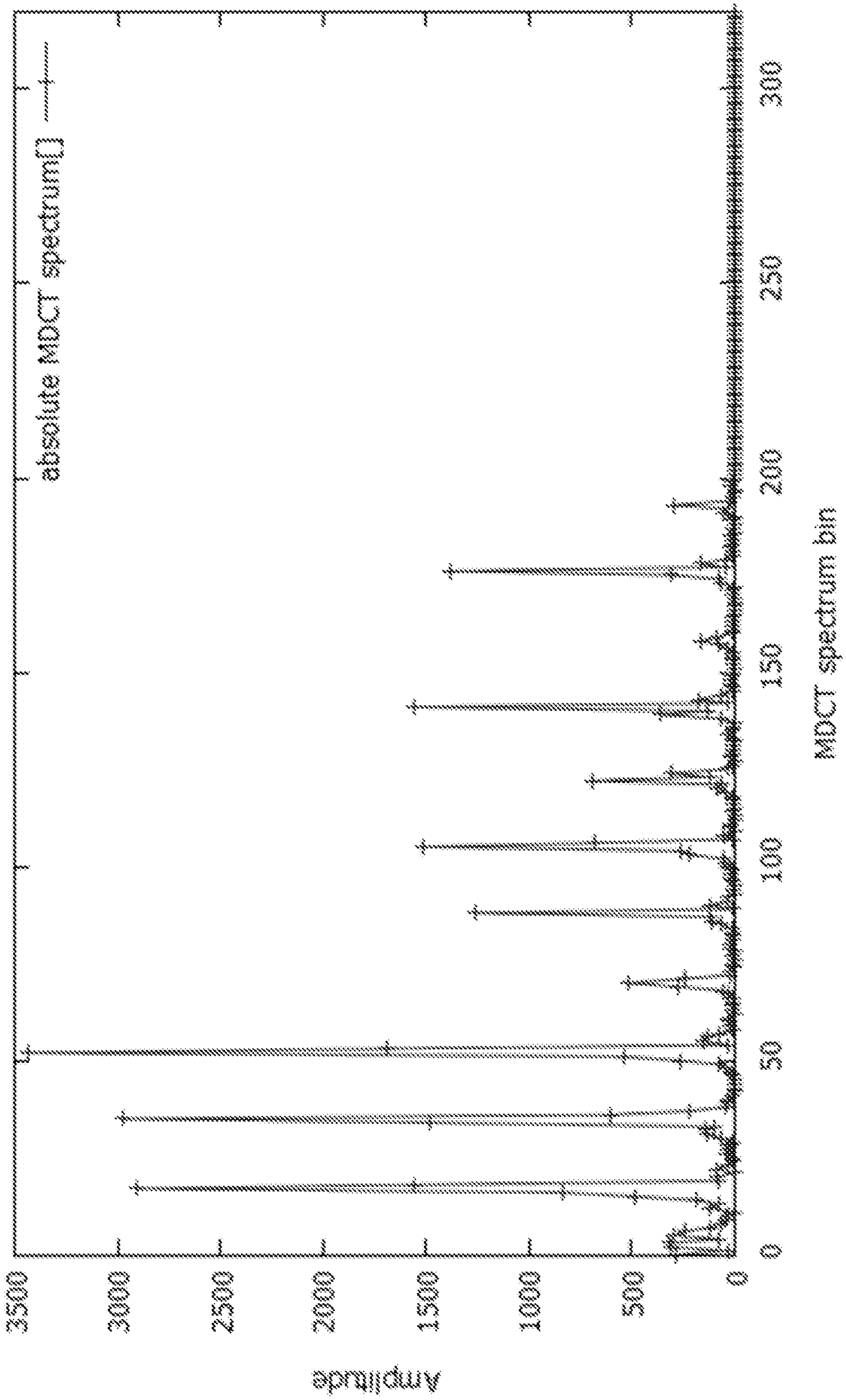
FIGS. 5A, 5B, 5C and 5D each illustrate an example of spectra having sparsity.
Figure 5B:
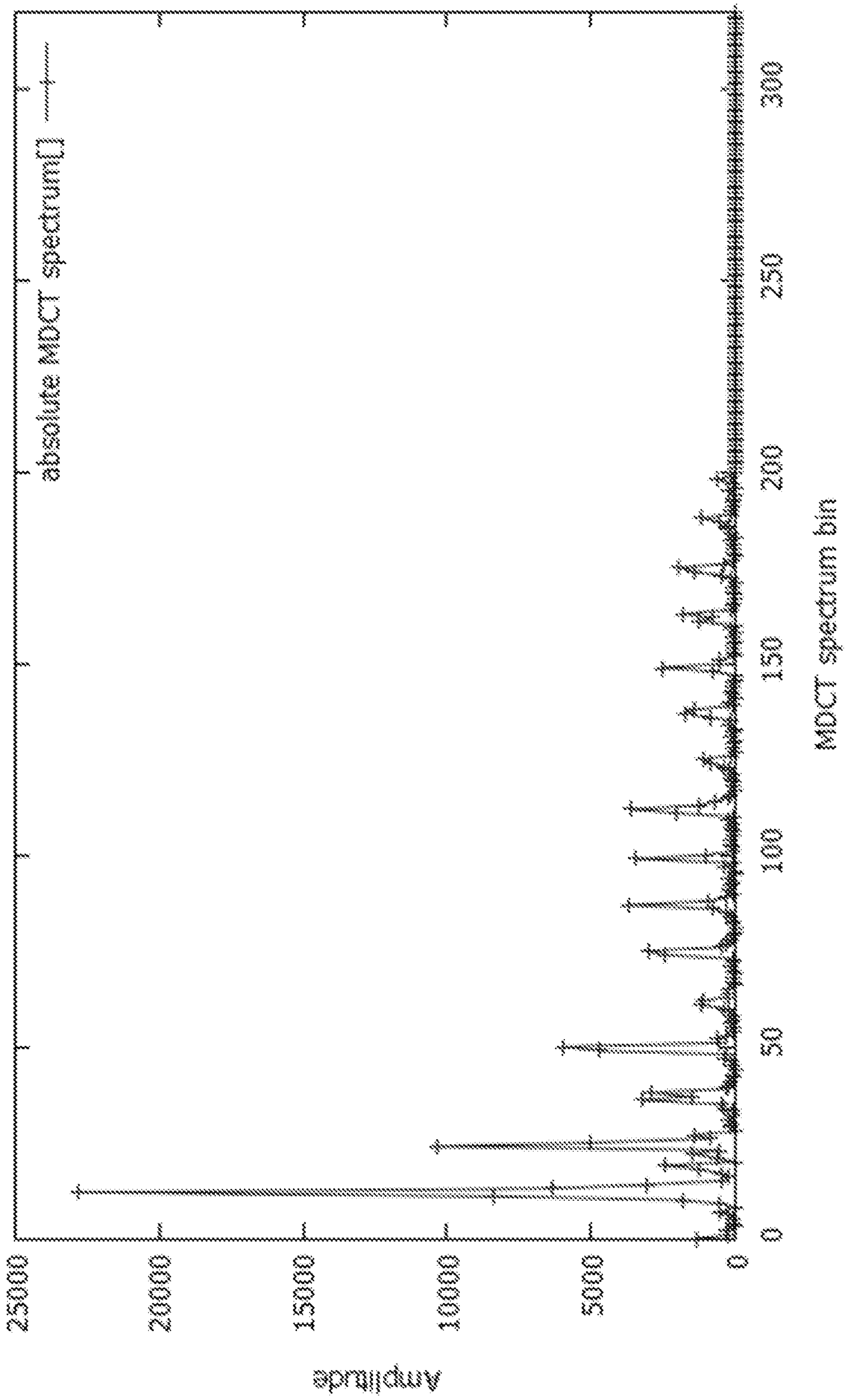

For example, in the MDCT spectra having the harmonics structure, peaks of the MDCT spectra appear intensively at certain spacings, as illustrated, for example, in FIG. 5A or 5B. In other words, when the MDCT spectra have the harmonics structure, the MDCT spectra at certain spacings (in other words, the peak components) may have larger amplitudes (or powers) than MDCT spectra at other frequencies (in other words, the components different from the peak components). Thus, as illustrated in FIG. 5A or FIG. 5B, the MDCT spectra having the harmonics structure may have the sparsity.

Figure 5C:
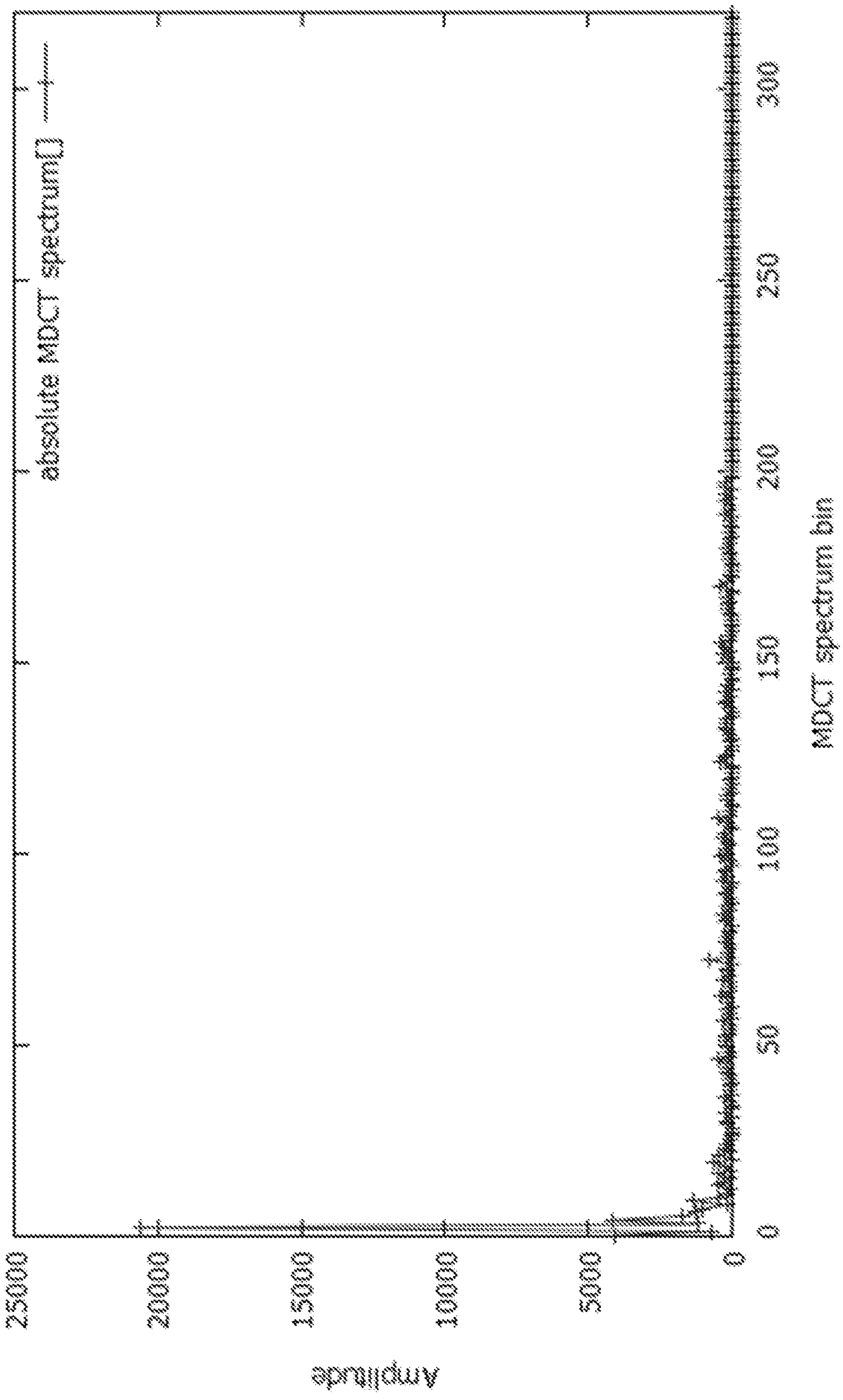
Figure 5D:
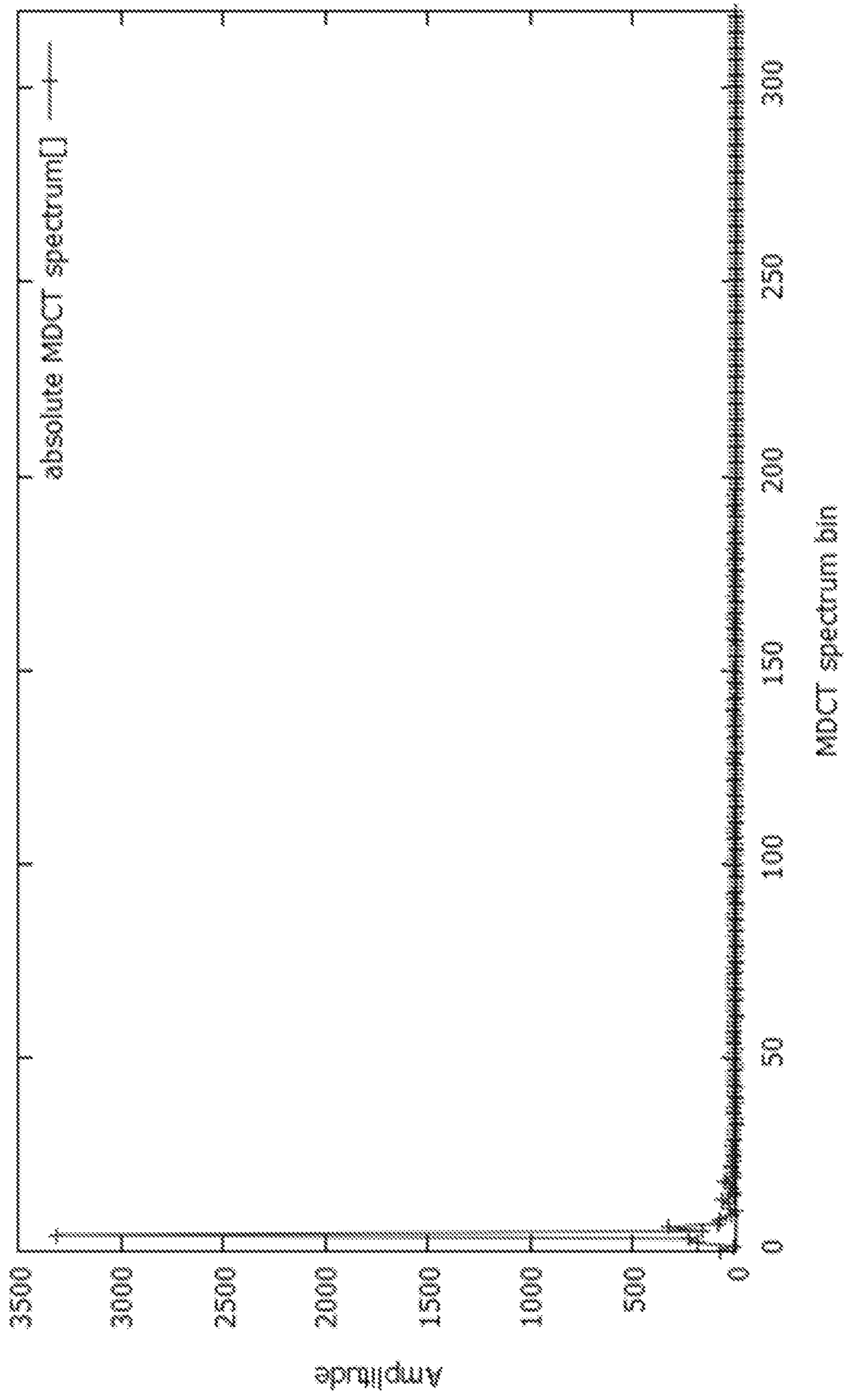

In addition, for example, as illustrated in FIG. 5C or FIG. 5D, energy may be concentrated in a part of the MDCT spectra. In other words, the part of the MDCT spectra in which energy is concentrated may have larger amplitudes than the other MDCT spectra. Therefore, as illustrated in FIG. 5C or FIG. 5D, the MDCT spectra in which energy is concentrated in a part of the spectra may have the sparsity.

Therefore, sparsity determiner 1422 may judge the sparsity based on the harmonics information, for example. Sparsity determiner 1422 may judge the sparsity based on, for example, the number of spectra accounting for a percentage equal to or greater than a threshold (e.g., 50%) in the MDCT spectra (in other words, the speech signal or the audio signal). Sparsity determiner 1422 may also judge the sparsity based on, for example, the envelope based on the LPC analysis and the MDCT spectra (e.g., absolute values). Note that, the judgement on the sparsity is not limited to that performed based on at least one parameter (or feature amount) of the harmonics information, envelope information, and MDCT spectra (e.g., absolute values), and may also be performed based on other parameters.

Note that an example of a condition for judging by sparsity determiner 1422 whether or not the MDCT spectra have the sparsity will be described later.

Quantization scale factor corrector 1423 corrects the initial value of the quantization scale factor, for example, based on whether or not the MDCT spectra have the sparsity. For example, quantization scale factor corrector 1423 corrects the quantization scale factor (initial value) when the MDCT spectra have the sparsity. On the other hand, when the MDCT spectra do not have the sparsity, for example, sparsity analyzer 142 does not correct the quantization scale factor. Quantization scale factor corrector 1423 outputs the obtained quantization scale factor to quantizer/encoder 15 (for example, FIG. 3).

Here, in FIG. 3, in quantization scale factor calculator 141, for example, the inverse of the standard deviation with respect to the multiplication values obtained by multiplication between the envelope (in other words, the scaled envelope) obtained based on the LPC analysis and the absolute values of the MDCT spectra is determined to be the quantization scale factor.

In addition, for example, as illustrated in FIGS. 5A to 5D, in the case of similar MDCT spectral peak values, the mean value of the MDCT spectra can be lower when the MDCT spectra have the sparsity than when the MDCT spectra do not have the sparsity (not illustrated).

For this reason, the energy or mean amplitude of the entire MDCT spectra (for example, corresponding to the above-described standard deviation) can be estimated to be lower in the case where the MDCT spectra have the sparsity than in the case where the MDCT spectra do not have the sparsity. Thus, for example, the quantization scale factor (e.g., the inverse of the standard deviation) determined in quantization scale factor calculator 141 may be larger in the case where the MDCT spectra have the sparsity than the quantization scale factor in the case where the MDCT spectra do not have the sparsity or than the quantization scale factor after search.

Figure 6:
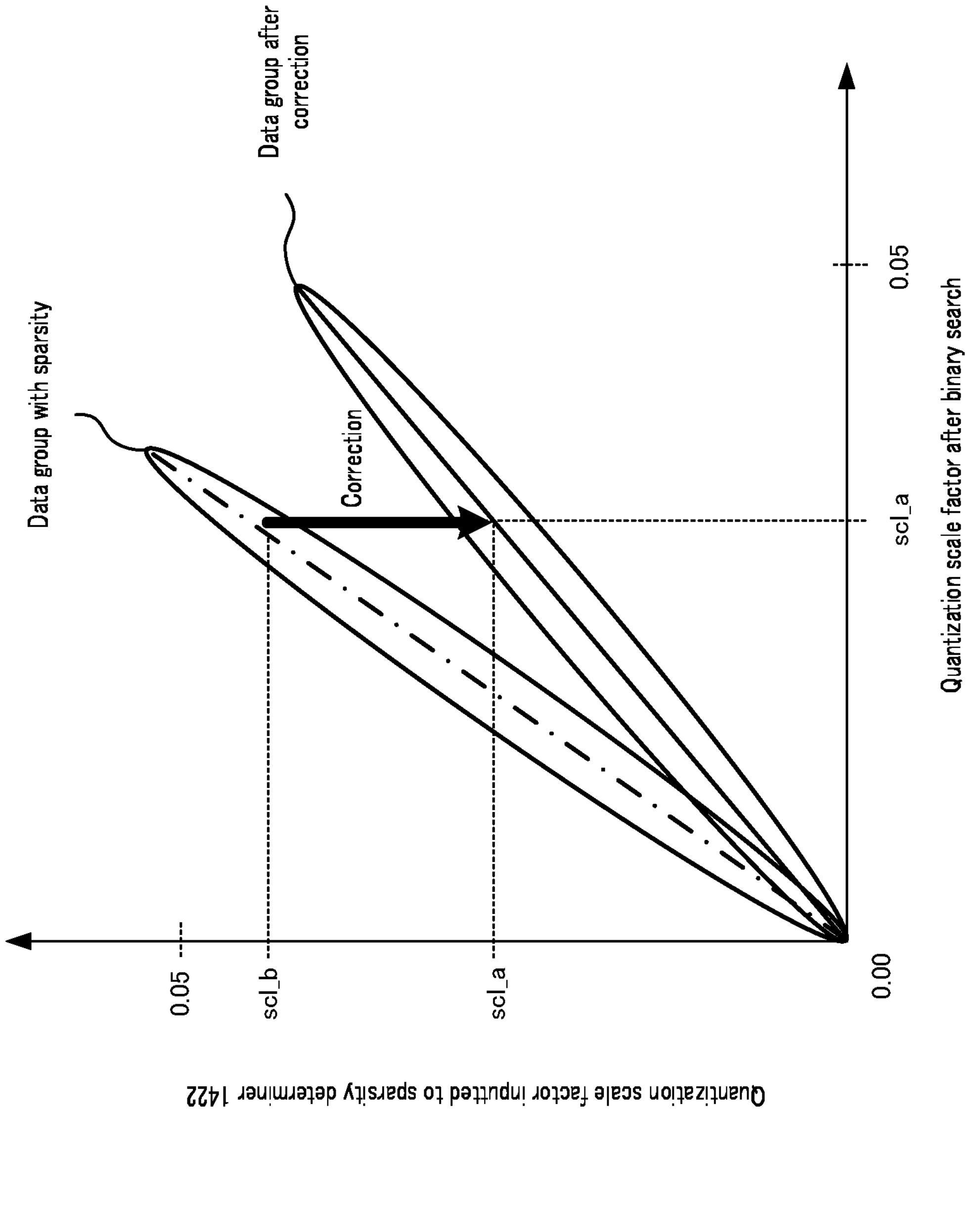
FIG. 6 illustrates an example of a sparsity-based quantization scale factor correction process.

FIG. 6 illustrates an example of a correction process for correcting the quantization scale factor based on the sparsity. For example, FIG. 6 illustrates an example of the correspondence between the quantization scale factor (in other words, the uncorrected quantization scale factor) in the case where the MDCT spectra have the sparsity and the quantization scale factor after search (in other words, the corrected quantization scale factor).

In FIG. 6, the horizontal axis represents the quantization scale factor after search (for example, the binary search), and the vertical axis represents the quantization scale factor inputted to sparsity determiner 1422. The quantization scale factor inputted to sparsity determiner 1422 may be, for example, a quantization scale factor calculated in quantization scale factor calculator 141, or may be a quantization scale factor adjusted in pre-processor 1421.

As illustrated in FIG. 6, for example, when the MDCT spectra are determined by sparsity determiner 1422 to have the sparsity, quantization scale factor corrector 1423 corrects (reduces) the uncorrected quantization scale factor (e.g., scl_b) to the quantization scale factor (e.g., scl_a).

The correction method for correcting the quantization scale factor may be configured based on, for example, a statistical relationship (e.g., simulation result) between the quantization scale factor in the presence of sparsity and the quantization scale factor after search, as illustrated in FIG. 6. For example, in the example of FIG. 6, uncorrected quantization scale factor scl_b is 0.0400 and corrected quantization scale factor scl_a is 0.0216. The ratio between scl_b and scl_a is "1.85." Therefore, for example, when the MDCT spectra have the sparsity, quantization scale factor corrector 1423 may correct quantization scale factor scl_b to value scl_a obtained by dividing value scl_b by 1.85 (for example, scl_a=scl_b/1.85.

Note that, the parameter "1.85" is one example, and is not limited to this value. The correction method for correcting the quantization scale factor is not limited to the above method, and other methods may be used.

The operation of sparsity analyzer 142 has been described above. For example, when the MDCT spectra have the sparsity, quantization scale factor searcher 143 is capable of starting the search based on the initial value of the corrected quantization scale factor. For example, in FIG. 6, quantization scale factor searcher 143 configures corrected quantization scale factor scl_a as the initial value to perform the binary search. This search makes it possible for quantization scale factor searcher 143 to reduce the number of searches performed until a convergence value by the binary search is obtained, that is, the amount of mathematical operation, for example, as compared with the case in which uncorrected quantization scale factor scl_b illustrated in FIG. 6 is configured as the initial value to perform the binary search.

Example of Judgement of Sparsity

Next, an example of a condition (judgement method) for sparsity determiner 1422 to judge whether or not the MDCT spectra have the sparsity will be described.

Judgment Condition 1

Based on judgement condition 1, sparsity determiner 1422 judges the sparsity based on whether or not the MDCT spectra have the "harmonics structure" as illustrated in FIG. 5A or 5B.

For example, sparsity determiner 1422 may judge the sparsity based on the harmonics flag, the harmonics gain index, and the mean value of the absolute values of MDCT spectra (hereinafter referred to as the "spectral mean value").

In addition, for example, sparsity determiner 1422 may judge that the MDCT spectra have the sparsity, when the harmonics flag is "ON" (in other words, when the MDCT spectra have the harmonics structure), when the harmonics gain index is equal to or higher than a threshold (in other words, when the harmonics gain is equal to or higher than the threshold), and when the number of spectra (in other words, also referred to as frequency bins or lines) exceeding the spectral mean value is less than a threshold.

For example, there is a possibility that, even when the MDCT spectra have the harmonics structure, the MDCT spectra do not have the sparsity when the number of spectra exceeding the spectral mean value is equal to or larger than the threshold, because a difference between the spectral peak components in the harmonics structure and other components different from the peak components becomes smaller. Therefore, when the number of spectra exceeding the spectral mean value is equal to or larger than the threshold, sparsity determiner 1422 may judge that the MDCT spectra do not have the sparsity.

Note that, in judgement condition 1, a plurality of thresholds for the harmonics gain index may be configured. Further, in judgement condition 1, a plurality of thresholds for the number of spectra exceeding the spectral mean value may be configured.

For example, the example illustrated in FIG. 5A illustrates the case where the harmonics flag is ON, the harmonics gain index is equal to or greater than threshold "X1" (e.g., X1=3), and the number of spectra exceeding the spectral mean value is less than threshold "Y1" (e.g., Y1=95).

Further, for example, the example illustrated in FIG. 5B illustrates the case where the harmonics flag is ON, the harmonics gain index is threshold "X2" (e.g., X2=2), and the number of spectra exceeding the spectral mean value is less than threshold "Y2" (e.g., Y2=85).

Note that the values of thresholds X1, X2, Y1, and Y2 are examples, and are not limited to these values. In addition, here, the description has been given of the case where the sparsity is judged based on one of the two patterns of conditions of the combination of X1 and Y1 and the combination of X2 and Y2, but the present disclosure is not limited thereto. For example, the number of patterns of combinations of threshold X for the harmonics gain index and threshold Y for the number of spectra exceeding the spectral mean value may be one pattern or three or more patterns.

Judgment Condition 2

Based on judgement condition 2, sparsity determiner 1422 judges the sparsity based on the number of MDCT spectra accounting for a percentage (for example, also referred to as a "composition ratio") equal to or larger than a threshold in the MDCT spectra, as illustrated in FIG. 5C.

For example, sparsity determiner 1422 may judge that the MDCT spectra have the sparsity, when the number of spectra accounting for the composition ratio of the MDCT spectra equal to or greater than the threshold (e.g., 50%) is equal to or less than threshold L1.

Alternatively, for example, sparsity determiner 1422 may judge that the MDCT spectra have the sparsity, when the number of spectra of the MDCT spectra accounting for the composition ratio equal to or greater than the threshold (e.g., 50%) is equal to or less than threshold L1, and when the number of spectra exceeding the root mean square (in other words, the power-mean value or the mean amplitude) of the absolute values of the MDCT spectra is less than threshold L2.

For example, when the number of spectra exceeding the root mean square of the absolute values of the MDCT spectra is equal to or greater than threshold L2, sparsity determiner 1422 may judge that the MDCT spectra do not have the sparsity because it is likely that the energy is not concentrated in a part of the spectra (in other words, is dispersed) in the distribution of the MDCT spectra.

For example, the example illustrated in FIG. 5C illustrates the case where energy is concentrated in k spectra (e.g., k=4) of the highest amplitudes, the MDCT spectra of the highest k amplitudes account for 50% or more of the sum of all the spectral amplitudes, and the number of spectra exceeding the root mean square of the absolute values of the MDCT spectra is less than threshold L1 (e.g., L1=13).

Note that judgement condition 2 may be applied, for example, to the case where the MDCT spectra do not have the harmonics structure (an example will be described later).

Judgment Condition 3

Based on judgement condition 3 like based on judgement condition 2, sparsity determiner 1422 judges the sparsity based on the number of MDCT spectra accounting for a percentage (or the "composition ratio") equal to or larger than a threshold in the MDCT spectra, as illustrated in FIG. 5D.

In addition, based on judgement condition 3, sparsity determiner 1422 may judge the sparsity not only based on the condition based on the composition ratio accounted for by spectra, but also based on the ratio between the "maximum value of the multiplication values obtained by multiplication between the envelope and the absolute values of the MDCT spectra" and the "root mean square."

For example, sparsity determiner 1422 may judge that the MDCT spectra have the sparsity, when the number of spectra of the MDCT spectra accounting for the composition ratio equal to or greater than the threshold (for example, 50%) is equal to or less than threshold L1, and when the ratio of the "maximum value of the multiplication values obtained by multiplication between the envelope and the absolute values of the MDCT spectra" to the "root mean square" is equal to or greater than threshold L2.

For example, when the ratio of the "maximum value of the multiplication values obtained by multiplication between the envelope and the absolute values of the MDCT spectra" to the "root mean square" is less than threshold L2, the ratio of the mean power (or amplitude) value to the maximum peak power (or amplitude) may be large in the MDCT spectra. Therefore, since it is highly likely that the maximum peak power (or amplitude) is not concentrated in a part of the spectra (in other words, is dispersed), sparsity determiner 1422 may judge that the MDCT spectra do not have the sparsity.

For example, the example illustrated in FIG. 5D illustrates the case where the highest k (e.g., k=4) spectral amplitudes account for 50% or more of the energy of the entire spectra (the sum of the spectral amplitudes), and the ratio of the "maximum value of the multiplication values obtained by multiplication between the envelope and the absolute values of the MDCT spectra" to the "root mean square" is equal to or greater than threshold L2 (e.g., L2=12.4).

Note that the values of parameter k and thresholds L1 and L2 are examples, and are not limited to these values.

Further, the description has been given of the case where, in judgement conditions 2 and 3, the threshold regarding the composition ratio accounted for by the spectra is 50%, but the present disclosure is not limited to 50%, and other percentages may be used.

In judgement conditions 2 and 3, for example, the condition that the composition ratio accounted for by k spectra exceeds 50% may be replaced with the condition that the percentage (for example, k/L_frame) of number k of spectra accounting for a composition ratio of 50% among the spectra in a frame (for example, number L_frame of spectra) is equal to or less than a threshold. For example, L_frame is 640, and k satisfying $k/L\_frame \leq 0.0559$ is 4 when the threshold=0.0559.

Judgement conditions 1 to 3 have been described above. Note that, judgement conditions 1 to 3 may be combined. In addition, the judgement condition for the sparsity is not limited to judgement conditions 1 and 2 and other judgement conditions may be used.

For example, sparsity determiner 1422 may switch the judgement condition for judging the sparsity of MDCT spectra based on the uncorrected quantization scale factor (initial value before correction) calculated based on the MDCT spectra.

Figure 7:
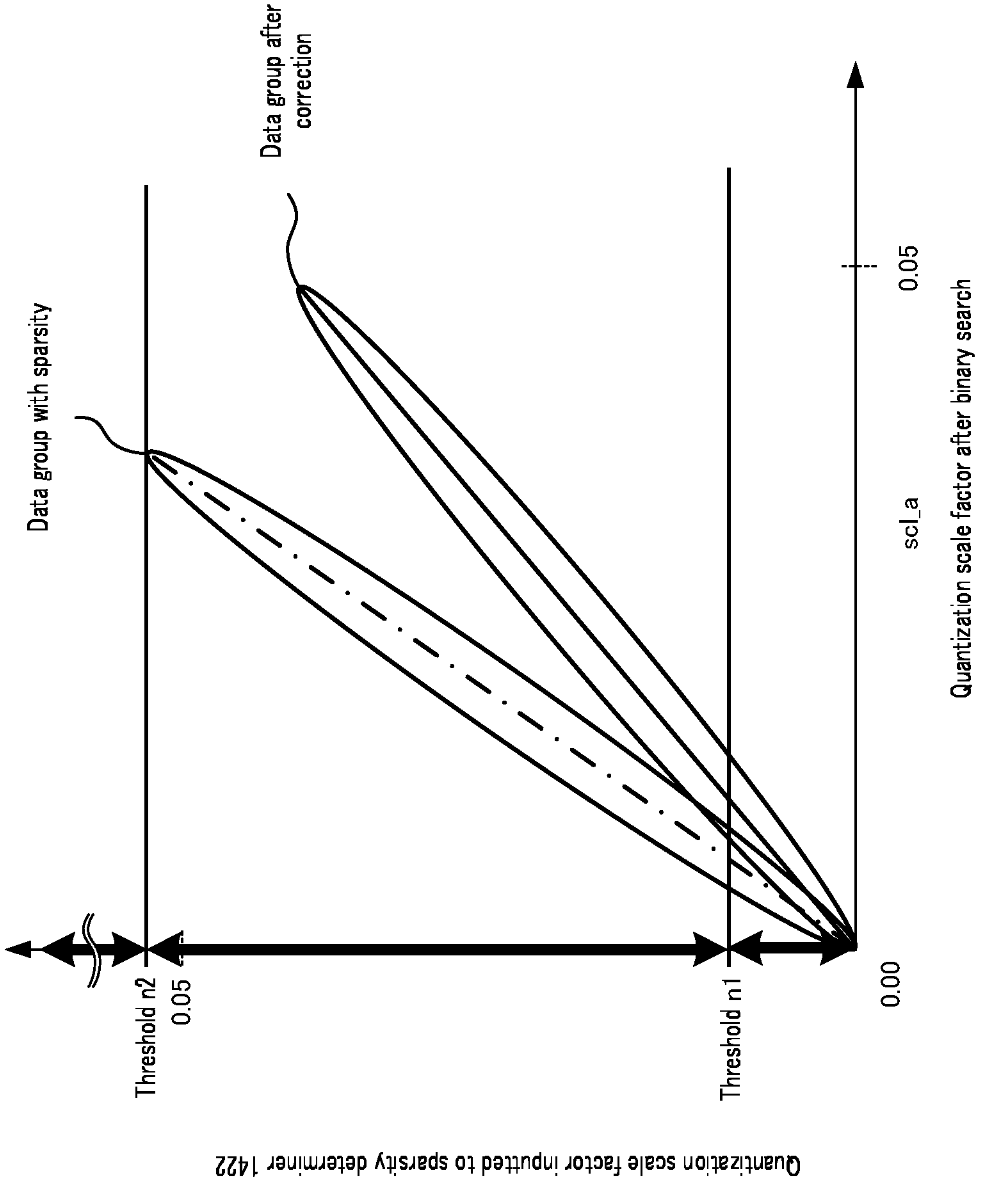
FIG. 7 illustrates an example of a sparsity judgment condition.

FIG. 7 illustrates an example of switching of the judgement conditions in sparsity determiner 1422.

For example, in the example of FIG. 7, sparsity determiner 1422 may apply judgement condition 1 and judgement condition 2 when the uncorrected quantization scale factor is less than threshold n1 (e.g., n1=0.01), and apply judgement condition 3 when the uncorrected quantization scale factor is equal to or greater than threshold n1 and equal to or less than threshold n2 (e.g., n2=0.0559).

Threshold n1 may be determined, for example, based on whether or not it is a quantization scale factor corresponding to MDCT spectra that may have the harmonics structure. For example, the larger the peak amplitude value of the MDCT spectra and the smaller the mean value of the MDCT spectral amplitudes, the more likely the MDCT spectra have the harmonics structure. Therefore, for example, when the uncorrected quantization scale factor is less than threshold n1 (in other words, when the peak amplitude value of the MDCT spectra is large and the mean value of the MDCT spectral amplitudes is small), sparsity determiner 1422 may judge, on the occasion of the sparsity judgement, whether or not the MDCT spectra have the harmonics structure. On the other hand, for example, when the uncorrected quantization scale factor is equal to or greater than threshold n1 (in other words, when the peak amplitude value of only several MDCT spectra is large and the mean value of the MDCT spectral amplitudes is small), sparsity determiner 1422 does not have to judge, on the occasion of the sparsity judgement, whether or not the MDCT spectra have the harmonics structure.

Threshold n2 may also be determined based on, for example, a lower limit value of the amplitude levels of the MDCT spectra scaled by the quantization scale factor.

For example, the smaller the amplitude levels of the MDCT spectra, the greater the quantization scale factor may be configured. However, when the amplitude levels of the MDCT spectra is around 0, the quantization scale factor may be configured to such a quantization scale factor that quantizes the MDCT spectra assuming the MDCT spectra to be 0 without a larger quantization scale factor being configured. In other words, depending on the configuration of the quantization scale factor, the MDCT spectra may be excessively scaled when an MDCT spectral amplitude level near 0 is forcibly quantized with a value greater than 0.

For example, in the example illustrated in FIG. 7, the upper limit value of the quantization scale factor, in other words, the lower amplitude-level limit value at which the MDCT spectra are quantized is configured by the configuration of threshold n2. The configuration of threshold n2 can prevent configuration of a larger quantization scale factor to suppress excessive scaling of the MDCT spectra, for example, when the amplitude levels of the MDCT spectra are near 0.

Further, for example, in FIG. 7, when the uncorrected quantization scale factor is larger than threshold n2, sparsity determiner 1422 does not have to perform the judgement on the sparsity. When the uncorrected quantization scale factor is larger than threshold n2, for example, quantization scale factor corrector 1423 may configure the quantization scale factor to a value of threshold n2 (for example, n2=0.0559 in FIG. 7) regardless of the presence or absence of sparsity. Note that, a corrected value of the quantization scale factor when the uncorrected quantization scale factor is larger than threshold n2 is not limited to threshold n2, but may also be other values (e.g., 0.05).

As described above, sparsity determiner 1422 switches the judgement conditions for judging the sparsity based on the uncorrected quantization scale factor (in other words, MDCT spectral amplitude levels). By switching the judgement conditions, sparsity determiner 1422 can judge the sparsity according to the features of the MDCT spectra (for example, the amplitude level, the presence or absence of the harmonics structure, or the like), and thus, the judgement accuracy for judging the sparsity can be improved.

Note that, the values of thresholds n1 and n2 are examples, and other values may be used. Further, the number of thresholds may be one or three or more.

As described above, in the present embodiment, in encoding apparatus 1, the initial value of the quantization scale factor is corrected based on whether or not the MDCT spectra of a speech signal or an audio signal have the sparsity, and the search for the quantization scale factor is performed based on the initial value. In other words, in encoding apparatus 1, the initial value of the quantization scale factor is corrected to a value closer to the quantization scale factor obtained in the binary search, for example. By this correction, for example, the number of searches in the binary search can be reduced, and the amount of mathematical operation in the search process for the quantization scale factor can be reduced. Therefore, according to the present embodiment, it is possible to reduce the amount of mathematical operation in the coding of the speech signal or the audio signal.

Variation 1

Figure 8:
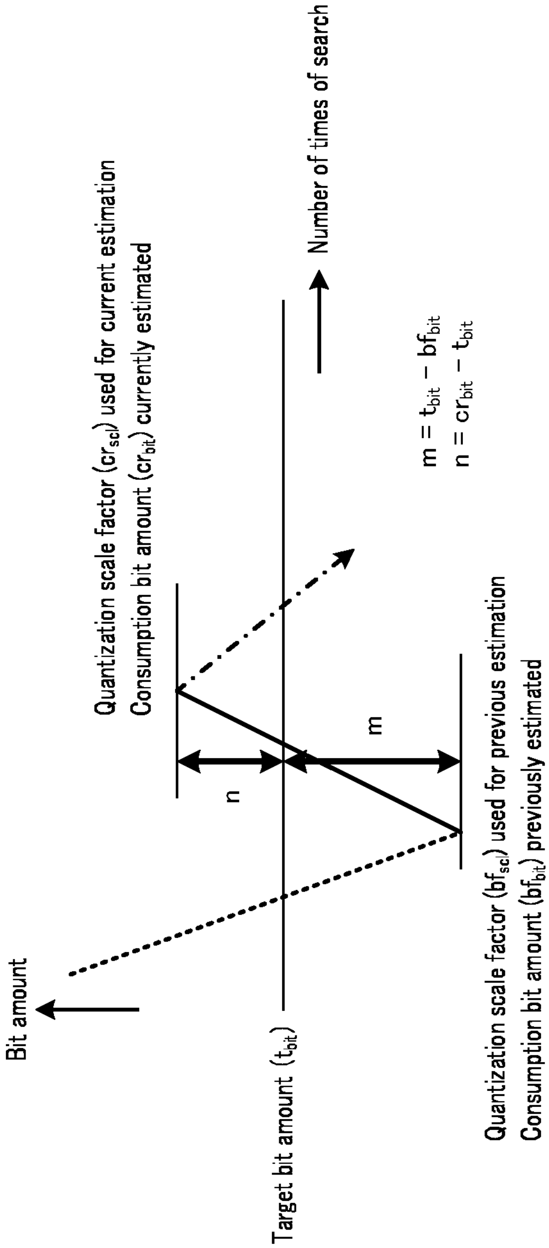
FIG. 8 illustrates an example of a search process for a quantization scale factor.

In variation 1, quantization scale factor searcher 143 (for example, FIG. 3) may perform a search process illustrated in FIG. 8.

In FIG. 8, quantization scale factor searcher 143 may calculate the quantization scale factor (e.g., expressed as "$nx_{scl}$") for the next search, for example, based on Expression 1:

[1]

$$m = t_{bit} - bf_{bit} \qquad \text{(Expression 1)}$$
$$n = cr_{bit} - t_{bit}$$
$$nx_{scl} = \frac{cr_{scl} * m + bf_{scl} * n}{m + n}.$$

In Expression 1, "$t_{bit}$" represents the target bit amount, "$bf_{bit}$" represents the consumption bit amount estimated for the arithmetic encoding on the MDCT spectra in the previous search, and "$cr_{bit}$" represents the consumption bit amount estimated for the arithmetic encoding on the MDCT spectra in the current search. In addition, "$bf_{scl}$" represents the quantization scale factor in the previous search, and "$cr_{scl}$" represents the quantization scale factor in the current search.

As described above, in Variation 1, quantization scale factor searcher 143 determines quantization scale factor $nx_{scl}$ for the next search based on difference n between consumption bit amount $cr_{bit}$ estimated for the arithmetic coding on the MDCT spectra in the current search and target bit amount $t_{bit}$, and difference m between consumption bit amount $bf_{bit}$ estimated for the arithmetic coding on the MDCT spectra in the previous search and the target bit amount $t_{bit}$. Note that, "$nx_{scl}$" satisfies "$bf_{scl} \leq nx_{scl} \leq cr_{scl}$" or "$cr_{scl} \leq nx_{scl} \leq bf_{scl}$."

In other words, quantization scale factor searcher 143 weights the quantization scale factor used for each search based on the differences (e.g., m and n) between the consumption bit amounts estimated for the searches and the target bit amount.

For example, in the example illustrated in FIG. 8, difference n between consumption bit amount $cr_{bit}$ at the time of the current search and target bit amount $t_{bit}$ is smaller than difference m between consumption bit amount $bf_{bit}$ at the time of the previous search and target bit amount $t_{bit}$. Thus, quantization scale factor searcher 143 configures a larger weight for quantization scale factor $cr_{scl}$ in the current search than for quantization scale factor $bf_{scl}$ in the previous search (e.g., $|m|<|n|$) and determines quantization scale factor $nx_{scl}$ for the next search.

In addition, letting the quantization scale factor at the time of the next search obtained by weighting be denoted by "$wg_{scl}$," the quantization scale factor at the time of the next search obtained by the binary search be denoted by "$bi_{scl}$" (in the case of the binary search method, weighting factor $bi_{scl}$ is 0.5), quantization scale factor searcher 143 may determine quantization scale factor $nx_{scl}$ at the time of the next search based on the weighted sum of the two quantization scale factors. The weighting factor of this weighting may vary from search to search. For example, the weighting factor may be changed by starting with $nx_{scl}=1\times wg_{scl}+0\times bi_{scl}$, the weight may be increased or decreased by 0.25 at each time as given by $nx_{scl}0.75\times wg_{scl}+0.25\times bi_{scl}$, $nx_{scl}=0.5\times wg_{scl}+0.5\times bi_{scl}$, and $nx_{scl}=0.25\times wg_{scl}+0.75\times bi_{scl}$, and finally, the same $nx_{scl}=0\times wg_{scl}+1\times bi_{scl}$ as that in the binary search method may be used. When generalized, $nx_{scl}$ is expressed by Expression 2:

(Expression 2).

$$nx_{scl}=\alpha\times wg_{scl}+(1-\alpha)\times bi_{scl},\ 0\leq\alpha\leq 1 \quad [2]$$

According to Variation 1, for example, the quantization scale factor satisfying the target bit amount can be searched for faster (with a smaller number of searches) as compared with the case where an intermediate value of the quantization scale factors at the time of the previous search and at the time of the current search is configured as the quantization scale factor at the time of the next search. It is thus possible to reduce the number of searches for the quantization scale factor in quantization scale factor searcher 143, so as to reduce the amount of mathematical operation.

Note that, the search to be compared with the consumption hit amount in the current search is not limited to the previous search (in other words, the search immediately before the current search), but may be a search before the previous search. Further, the search in which the quantization scale factor is determined based on a plurality of searches is not limited to the next search (in other words, the search immediately after the current search), but may be a search after the next search. Further, the search to be compared with the consumption bit amount in the current search is not limited to one search in the past, and the consumption bit amounts in a plurality of searches in the past may be used.

Variation 2

In sparsity analyzer 142 illustrated in FIG. 4, pre-processor 1421 may, for example, adjust (in other words, limit) the upper limit value of the quantization scale factor (initial value) in addition to performing the above-described operation (e.g., adjustment of the quantization scale factor). In this case, sparsity determiner 1422 may judge the sparsity based on the output of pre-processor 1421 (the quantization scale factor for which the upper limit value is adjusted).

For example, when adjusting the upper limit value of the quantization scale factor, pre-processor 1421 may configure threshold n2 illustrated in FIG. 7 as the upper limit value. With this configuration, the lower limit value of MDCT spectral amplitude levels that is scaled by the quantization scale factor is configured as described above, and excessive scaling of MDCT spectra can be suppressed. Further, when the upper limit value of the quantization scale factor is adjusted to n2 in pre-processor 1421, threshold n2 does not have to be configured in the sparsity judgement (e.g., FIG. 7) since no quantization scale factor larger than threshold n2 is inputted to sparsity determiner 1422.

Note that the upper limit value of the quantization scale factor in pre-processor 1421 may be a value different from threshold n2.

Variation 3

For example, when the MDCT spectra are determined to have the sparsity and the number of spectra accounting for the composition ratio of the threshold (e.g., 50%) is equal to or less than the threshold, encoding apparatus 1 may perform pulse coding, rather than arithmetic coding, on the quantized MDCT spectra. By this processing, coding efficiency can be improved.

Note that, encoder 152 illustrated in FIG. 3 may include, for example, a switch for switching the encoding method, an arithmetic encoder, and a pulse encoder. Further, encoding apparatus 1 may generate information indicating, for example, the encoding method applied to the encoding on the MDCT spectra, and transmit the generated information to decoding apparatus 2. Note that, when decoding apparatus 2 supports a plurality of encoding methods including, for example, arithmetic encoding and pulse encoding, and the encoding method in encoding apparatus 1 can be identified by decoding apparatus 2, the information indicating the encoding method does not have to be notified to decoding apparatus 2.

The embodiments of the present disclosure have been described above.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other “things” in a network of an “Internet of Things (IoT)”.

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A quantization scale factor determination apparatus according to an embodiment of the present disclosure includes: correction circuitry, which, in operation, corrects an initial value of a quantization scale factor based on whether or not a spectrum of a speech audio signal has sparsity: and search circuitry, which, in operation, searches for the quantization scale factor based on the initial value.

In an exemplary embodiment of the present disclosure, the quantization scale factor determination apparatus further includes judgement circuitry, which, in operation, judges whether or not the spectrum has the sparsity.

In an exemplary embodiment of the present disclosure, the judgement circuitry judges the sparsity based on a harmonics structure of the spectrum.

In an exemplary embodiment of the present disclosure, the judgement circuitry judges the sparsity based on a number of spectra accounting for a percentage equal to or greater than a threshold in the speech audio signal.

In an exemplary embodiment of the present disclosure, the judgement circuitry judges the sparsity based on an absolute value of the spectrum and an envelope of the spectrum.

In an exemplary embodiment of the present disclosure, the judgement circuitry switches a condition for judging the sparsity, the switching being based on the initial value before correction that is calculated based on the spectrum.

In an exemplary embodiment of the present disclosure, the quantization scale factor determination apparatus further includes pre-processing circuitry, which, in operation, adjusts an upper limit value of the initial value, in which the judgement circuitry judges the sparsity based on an output of the pre-processing circuitry.

In one embodiment of the present disclosure, the search circuitry determines the quantization scale factor for a third search after a first search based on a difference between a target bit amount and a consumption bit amount estimated for encoding on the spectrum in the first search, and a difference between the target bit amount and a consumption bit amount estimated for encoding on the spectrum in a second search before the first search.

In an exemplary embodiment of the present disclosure, the quantization scale factor determination apparatus further includes calculation circuitry, which, in operation, calculates the initial value based on one of a variance and a standard deviation of a spectral amplitude of the speech audio signal.

A quantization scale factor determination method according to an embodiment of the present disclosure includes steps performed by a quantization scale factor determination apparatus of: correcting an initial value of a quantization scale factor based on whether or not a spectrum of a speech audio signal has sparsity: and searching for the quantization scale factor based on the initial value.

The disclosure of Japanese Patent Application No. 2019-189177 dated Oct. 16, 2019 including the specification, drawings and abstract is incorporated herein by reference in its entirety.

INDUSTRIAL APPLICABILITY

An exemplary embodiment of the present disclosure is useful for a transmission system for transmitting a speech signal or an audio signal, or the like.

REFERENCE SIGNS LIST

1 Encoding apparatus
2 Decoding apparatus
10 TCX encoder
11 Envelope generator
12 Harmonics analyzer
13 Envelope scaler
14 Rate loop processor
15 Quantizer/encoder
141 Quantization scale factor calculator
142 Sparse analyzer
143 Quantization scale factor searcher
151 Quantizer
152 Encoder
1421 Pre-processor
1422 Sparsity determiner
1423 Quantization scale factor corrector

The invention claimed is:

1. A quantization scale factor determination apparatus, comprising:

correction circuitry, which, in operation, corrects an initial value of a quantization scale factor based on whether or not a spectrum of a speech audio signal has sparsity; and search circuitry, which, in operation, searches for the quantization scale factor based on the initial value.

2. The quantization scale factor determination apparatus according to claim 1, further comprising:

judgement circuitry, which, in operation, judges whether or not the spectrum has the sparsity.

3. The quantization scale factor determination apparatus according to claim 2, wherein the judgement circuitry judges the sparsity based on a harmonics structure of the spectrum.

4. The quantization scale factor determination apparatus according to claim 2, wherein the judgement circuitry judges the sparsity based on a number of spectra accounting for a percentage equal to or greater than a threshold in the speech audio signal.

5. The quantization scale factor determination apparatus according to claim 2, wherein the judgement circuitry judges the sparsity based on an absolute value of the spectrum and an envelope of the spectrum.

6. The quantization scale factor determination apparatus according to claim 2, wherein the judgement circuitry switches a condition for judging the sparsity, the switching being based on the initial value before correction that is calculated based on the spectrum.

7. The quantization scale factor determination apparatus according to claim 2, further comprising:

pre-processing circuitry, which, in operation, adjusts an upper limit value of the initial value, wherein the judgement circuitry judges the sparsity based on an output of the pre-processing circuitry.

8. The quantization scale factor determination apparatus according to claim 1, wherein the search circuitry determines the quantization scale factor for a third search after a first search based on a difference between a target bit amount and a consumption bit amount estimated for encoding on the spectrum in the first search, and a difference between the target bit amount and a consumption bit amount estimated for encoding on the spectrum in a second search before the first search.

9. The quantization scale factor determination apparatus according to claim 1, further comprising:

calculation circuitry, which, in operation, calculates the initial value based on one of a variance and a standard deviation of a spectral amplitude of the speech audio signal.

10. A quantization scale factor determination method, performed by a quantization scale factor determination apparatus, the method comprising:

correcting an initial value of a quantization scale factor based on whether or not a spectrum of a speech audio signal has sparsity; and searching for the quantization scale factor based on the initial value.

* * * * *